US007893342B2

(12) United States Patent
Sugimoto et al.

(10) Patent No.: US 7,893,342 B2
(45) Date of Patent: Feb. 22, 2011

(54) INFORMATION PROCESSING TERMINAL AND MUSIC INFORMATION GENERATING PROGRAM

(75) Inventors: Tetsurou Sugimoto, Yokohama (JP); Yusuke Satoh, Yokohama (JP); Tomoko Obama, Kadoma (JP); Hideaki Matsuo, Yokohama (JP)

(73) Assignee: Panasonic Corporation, Osaka (JP)

( * ) Notice: Subject to any disclaimer, the term of this patent is extended or adjusted under 35 U.S.C. 154(b) by 170 days.

(21) Appl. No.: 12/439,667

(22) PCT Filed: Sep. 6, 2007

(86) PCT No.: PCT/JP2007/067431

§ 371 (c)(1), (2), (4) Date: Mar. 2, 2009

(87) PCT Pub. No.: WO2008/029889

PCT Pub. Date: Mar. 13, 2008

(65) Prior Publication Data

US 2009/0316862 A1 Dec. 24, 2009

(30) Foreign Application Priority Data

Sep. 8, 2006 (JP) .............................. 2006-243863

(51) Int. Cl.
*G10H 1/06* (2006.01)
(52) U.S. Cl. .............................. 84/622; 84/625; 84/634; 84/659; 84/660; 84/666
(58) Field of Classification Search ........................ None
See application file for complete search history.

(56) References Cited

U.S. PATENT DOCUMENTS

| 2007/0208569 A1* | 9/2007 | Subramanian et al. ....... 704/270 |
| 2008/0139311 A1* | 6/2008 | Bates et al. ................... 463/35 |
| 2009/0079690 A1* | 3/2009 | Watson et al. ................ 345/156 |
| 2009/0082102 A1* | 3/2009 | Sargaison et al. ............. 463/31 |
| 2009/0251553 A1* | 10/2009 | Cambell et al. ......... 348/211.99 |
| 2009/0268040 A1* | 10/2009 | Campbell et al. ......... 348/207.1 |
| 2010/0114579 A1* | 5/2010 | Ostermann et al. .......... 704/260 |
| 2010/0211966 A1* | 8/2010 | Zhang et al. .................. 725/10 |
| 2010/0240416 A1* | 9/2010 | Knight ........................ 455/566 |

FOREIGN PATENT DOCUMENTS

| JP | 2002032306 A | 1/2002 |
| JP | 2002215633 A | 8/2002 |

(Continued)

*Primary Examiner*—Marlon T Fletcher
(74) *Attorney, Agent, or Firm*—Seed IP Law Group PLLC

(57) ABSTRACT

An object of the present invention is to provide an information processing terminal that specifies emotions from a voice and audio outputs music suitable for the specified emotions to enable the emotions of a loudspeaker who uttered the voice to be recognized readily.

In an information processing terminal according to the present invention, an emotion inferring unit 23 detects, from sound information, at least two emotions of an utterer who uttered a voice included in the sound information, and a music data generating unit 24 synthesizes music data, stored in a music parts database 242 and corresponding to the emotions detected by the emotion inferring unit 23, and a controller 22 reproduces the music data generated by the music data generating unit 24.

25 Claims, 9 Drawing Sheets

FOREIGN PATENT DOCUMENTS

| | | |
|---|---|---|
| JP | 2004061666 A | 2/2004 |
| JP | 2005204021 A | 7/2005 |
| JP | 2005252595 A | 9/2005 |
| JP | 2005352151 A | 12/2005 |
| JP | 2006084749 A | 3/2006 |
| JP | 2006106711 A | 4/2006 |
| JP | 2006155157 A | 6/2006 |
| JP | 2006178104 A | 7/2006 |
| WO | 0062279 A1 | 10/2000 |
| WO | 2006028223 A1 | 3/2006 |

* cited by examiner

FIG. 9

```
┌ TABLE FOR "JIRO MATSUSHITA"
   ┌─────────────────────┬──────────┐
   │ 2006/01/23/21/00    │ SADNESS  │
┌ TABLE FOR "HANAKO MATSUSHITA"
   ┌─────────────────────┬──────────┐
   │ 2006/01/28/23/00    │ DISGUST  │
┌ TABLE FOR "TARO MATSUSHITA"
   ┌─────────────────────┬──────────┐
   │ 2006/01/23/21/00    │ JOY      │
   │ 2006/01/24/09/30    │ JOY      │
   │ 2006/01/27/16/00    │ SADNESS  │
   │ 2006/01/27/16/00    │ ANGER    │
              ⋮
   │ yyyy/mm/dd/hh/mm    │ EMOTION  │
```

INFORMATION PROCESSING TERMINAL AND MUSIC INFORMATION GENERATING PROGRAM

TECHNICAL FIELD

The present invention relates to an information processing terminal and a music information generating method, by which at least two music information items, made up of music data (a WAV format, MIDI format, MP3 format, etc., can be cited as examples of data formats of the music data), are synthesized, and a program for causing a computer to execute the music information generating method.

BACKGROUND ART

An art of inferring an emotion of a person from a voice uttered by the person, or more specifically from a volume of the voice, a waveform of the voice, a pitch of the voice, phoneme, etc., has been disclosed (Patent Document 1). As principal factors of emotion inferred from a certain voice, the six factors of joy, sadness, surprise, disgust, anger, and fear are used in many cases.

Further, Patent Document 2 discloses an information processing terminal making use of the above art of inferring a person's emotions to specify an emotion from a voice during voice call and reproducing, on a display, a still image or moving image that can be associated in one glance with the specified emotion.

Patent Document 1: International Patent Publication No. WO 00/62279

Patent Document 2: Japanese Published Unexamined Patent Application No. 2006-106711

DISCLOSURE OF THE INVENTION

Problem to be Solved by the Invention

Methods of expressing a person's emotion by sound are being used widely in recent years. For example, in a television program, by outputting, to a viewer viewing the television program, a sound effect befitting an emotion that the viewer viewing a certain scene will feel when the scene is being televised, the viewer viewing the scene is made to feel the predetermined emotion readily. Further, in a case where a person recognizes an emotion expressed by a sound from just the sound, although there are slight deviations in the emotion recognized depending on the person, there is a general tendency for an emotion in common to be recognized.

The present invention has been made in view of the above circumstances, and an object thereof is to provide an information processing terminal and a music information generating method and program, by which emotions are specified from a voice and music suitable for the specified emotions is audio output to enable the emotions of a loudspeaker who uttered the voice to be recognized readily.

Means for Solving the Problem

An information processing terminal according to the present invention includes: an emotion detecting unit which detects, from an emotion specifying information item including information enabling specifying of emotions, emotions included in the emotion specifying information item; a music storage unit which stores music information items corresponding to emotions expressed by humans; a music synthesizing unit which synthesizes at least two of the music information items stored in the music storage unit to produce a separate music information item; and a music output unit which outputs a music information item, wherein the emotion detecting unit detects at least two emotions from the emotion specifying information item, the music synthesizing unit synthesizes the music information items, stored in the music storage unit and corresponding to the emotions detected by the emotion detecting unit, and the music reproducing unit outputs the separate music information item generated by the music synthesizing unit.

Further, the information processing terminal according to the present invention includes a configuration wherein the emotion specifying information item is a sound information item, and the emotion detecting unit detects, from the sound information item, at least two emotions of an utterer who uttered a voice included in the sound information item.

Further, the information processing terminal according to the present invention includes a configuration wherein the emotion specifying information item is a textual information item, and the emotion detecting unit detects, from the textual information item, at least two emotions of a composer who composed a text made up of the textual information item.

Further, the information processing terminal according to the present invention includes a configuration wherein the emotion specifying information item is an image information item, and the emotion detecting unit detects, from the image information item, at least two emotions of a subject appearing in an image reproduced from the image information item.

A music information generating method according to the present invention includes the steps of: detecting, from an emotion specifying information item including information enabling specifying of emotions, at least two emotions included in the emotion specifying information item; acquiring music information items respectively corresponding to the detected emotions; synthesizing the acquired music information items to generate a separate music information item; and outputting the separate music information item generated.

A program according to the present invention causes a computer to execute the music information generating method according to the present invention.

By this configuration, emotions of an utterer who uttered a voice can be recognized from music expressing the emotions.

Further, the information processing terminal according to the present invention includes a configuration including a sound information input unit, inputting the sound information item, wherein the emotion detecting unit detects, from the sound information item input from the sound information input unit, emotions of an utterer who uttered a voice included in the sound information item.

Further, the information processing terminal according to the present invention includes a configuration including a communication unit, wherein the sound information input unit inputs a sound information item acquired from a telephone device of a call destination by a voice call using the communication unit.

With this configuration, because the input of a voice and the specifying of the emotions of the utterer who uttered the voice can be performed with the same terminal, user convenience is improved.

Further, the information processing terminal according to the present invention includes a configuration including a sound pickup unit, picking up sound, wherein the sound information input unit inputs a sound information item picked up by the sound pickup unit.

Further, the information processing terminal according to the present invention includes a configuration including a textual information input unit, inputting the textual information item, wherein the emotion detecting unit detects, from the textual information item input from the textual information input unit, emotions of a composer who composed a text made up of the textual information item.

With this configuration, based on sound information uttered by a called party or a calling party per se to the other party, emotions of the utterer who uttered the voice can be recognized from the music expressing the emotions.

Further, the information processing terminal according to the present invention includes a configuration including a communication unit, wherein the textual information input unit inputs a textual information item included as an information item in an electronic mail received by the communication unit.

Further, the information processing terminal according to the present invention includes a configuration including an operating unit, wherein the textual information input unit inputs a textual information item corresponding to a textual input operation accepted from the operating unit.

With this configuration, emotions of a composer who composed an electronic mail can be specified from a mail title or a mail text indicated in the mail.

Further, the information processing terminal according to the present invention includes a configuration including an image information input unit, inputting the image information item, wherein the emotion detecting unit detects, from the image information item input from the image information input unit, emotions of a subject who appears in an image reproduced from the image information item.

Further, the information processing terminal according to the present invention includes a configuration including an image taking unit, wherein the image information input unit inputs an image taken by the image taking unit.

Further, the information processing terminal according to the present invention includes a configuration including a communication unit, wherein the image information input unit inputs an image information item received by the communication unit.

With this configuration, by specifying, from an image, emotions of a subject appearing in the image, a new application of the image can be proposed.

Further, the information processing terminal according to the present invention includes a configuration wherein the emotion detecting unit detects, for each of a plurality of emotion specifying information items, respective emotions included in the emotion specifying information items.

With this configuration, each time a sound information item is input, emotions of an utterer who uttered a voice included in the sound information item can be specified.

Further, the information processing terminal according to the present invention includes a configuration including: an utterer specifying unit, specifying an expresser who expressed the emotions included in the emotion specifying information item; and an associating unit, associating, for each emotion specifying information item, the expresser specified by the utterer specifying unit and the emotions detected by the emotion detecting unit; wherein the music synthesizing unit synthesizes the music information items, stored in the music storage unit and corresponding to at least two of the emotions associated with the expresser by the associating unit.

The music information generating method according to the present invention includes the steps of: associating emotions included in the emotion specifying information item and at least two of which are detected from the emotion specifying information item, and an expresser who expressed the emotions, for each emotion specifying information item including information enabling specifying of emotions; acquiring music information items respectively corresponding to the at least two emotions associated with the expresser; synthesizing the acquired music information items to generate a separate music information item; and outputting the separate music information item generated.

Further, the music information generating method according to the present invention includes a configuration including the steps of: inputting the emotion specifying information item; and detecting, from the input emotion specifying information item, emotions included in the emotion specifying information item.

Further, the information processing terminal according to the present invention includes a configuration including: an utterer specifying unit, specifying an utterer who uttered a voice included in the sound information item; and an associating unit, associating, for each music information item, the utterer specified by the utterer specifying unit and the emotions detected by the emotion detecting unit; wherein the music synthesizing unit synthesizes the music information items, stored in the music storage unit and corresponding to at least two of the emotions associated with the utterer by the associating unit.

Further, the information processing terminal according to the present invention includes a configuration including a communication unit, wherein, in a case where a voice call using the communication unit is performed, the utterer specifying unit uses a caller identification information item, notified from a telephone device of a call destination, to specify the utterer who uttered the voice included in the sound information item.

Further, the information processing terminal according to the present invention includes a configuration wherein the associating unit associates, for each voice call, the utterer, specified by the utterer specifying unit, and the emotions, detected by the emotion detecting unit.

Further, the information processing terminal according to the present invention includes a configuration wherein the music synthesizing unit synthesizes the music information items, stored in the music storage unit and corresponding to the at least two emotions associated with the utterer for each voice call by the associating unit, in a sequence based on times at which the voice calls were made.

Further, the music information generating method according to the present invention includes a configuration including the steps of: inputting a sound information item used in a voice call; associating, for each voice call, emotions, at least two of which are detected from the input sound information item and being emotions of an utterer who uttered a voice included in the sound information item, and the utterer, who uttered the voice included in the sound information item and specified using a caller identification information item notified by a telephone device of a call destination; acquiring music information items respectively corresponding to the at least two emotions associated with the utterer for each voice call; synthesizing the acquired music information items in a sequence based on times at which the voice calls were made to generate a separate music information item; and outputting the separate music information item generated.

Further, the information processing terminal according to the present invention includes a configuration including: a composer specifying unit, specifying a composer who composed a text made up of the textual information item; and an associating unit, associating, for each textual information item, the composer specified by the composer specifying unit and the emotions detected by the emotion detecting unit, wherein the music synthesizing unit synthesizes the music information items, stored in the music storage unit and corresponding to at least two of the emotions associated with the composer by the associating unit.

Further, the information processing terminal according to the present invention includes a configuration including a communication unit, wherein, in a case where an electronic mail is received using the communication unit, the composer specifying unit uses a transmission source identification information item, notified from a transmission source of the electronic mail, to specify the composer who composed the text made up of the textual information item.

Further, the information processing terminal according to the present invention includes a configuration wherein the associating unit associates, for each electronic mail, the composer, specified by the composer specifying unit, and the emotions, detected by the emotion detecting unit.

Further, the information processing terminal according to the present invention includes a configuration wherein the music synthesizing unit synthesizes the music information items, stored in the music storage unit and corresponding to the at least two emotions associated with the composer for each electronic mail by the associating unit, in a sequence based on times at which the electronic mails were received.

The music information generating method according to the present invention includes the steps of: inputting a textual information item included as an information item in an electronic mail; associating, for each electronic mail, emotions, at least two of which are detected from the input textual information item and being emotions of a composer who composed a text made up of the textual information item, and the composer, who composed the text made up of the textual information item and specified using a transmission source identification information item notified by a transmission source of the electronic mail; acquiring music information items respectively corresponding to the at least two emotions associated with the composer for each electronic mail; synthesizing the acquired music information items in a sequence based on times at which the electronic mails were received to generate a separate music information item; and outputting the separate music information item generated.

Further, the information processing terminal according to the present invention includes a configuration including: a subject specifying unit, specifying a subject who appears in an image reproduced from the image information item; and an associating unit, associating, for each image information item, the subject specified by the subject specifying unit and the emotions detected by the emotion detecting unit, wherein the music synthesizing unit synthesizes the music information items, stored in the music storage unit and corresponding to at least two of the emotions associated with the subject by the associating unit.

Further, the information processing terminal according to the present invention includes a configuration including a communication unit, wherein, in a case where an image information item is received using the communication unit, the subject specifying unit uses a transmission source identification information item, notified from a transmission source, to specify the subject appearing in the image reproduced from the image information item.

Further, the information processing terminal according to the present invention includes a configuration wherein the associating unit associates, for each image information item received, the subject, specified by the subject specifying unit, and the emotions, detected by the emotion detecting unit.

Further, the information processing terminal according to the present invention includes a configuration wherein the music synthesizing unit synthesizes the music information items, stored in the music storage unit and corresponding to the at least two emotions associated with the subject for each image information item by the associating unit, in a sequence based on times at which the image information items were received.

Further, the music information generating method according to the present invention includes the steps of: inputting a received image information item; associating, for each received image information item, emotions, at least two of which are detected from the input image information item and being emotions of a subject appearing in an image reproduced from the image information item, and the subject, appearing in the image reproduced from the image information item and specified using a transmission source identification information item notified by a transmission source of the image information item; acquiring music information items respectively corresponding to the at least two emotions associated with the subject for each received image information item; synthesizing the acquired music information items in a sequence based on times at which the image information items were received to generate a separate music information item, and outputting the separate music information item generated.

With this configuration, just the emotions of a specific utterer can be selected selectively and music corresponding to the emotions can be listened to.

Further, the information processing terminal according to the present invention includes a configuration wherein the music output unit reproduces the separate music information item generated by the music synthesizing unit.

With this configuration, because a function of specifying emotions and a function of reproducing music corresponding to the specified emotions are present in the same device, user convenience is improved.

Further, the information processing terminal according to the present invention includes a configuration wherein the music output unit sends the separate music information item, generated by the music synthesizing unit, to another terminal.

With this configuration, the terminal having the emotion specifying function can send the music corresponding to the emotions specified by the terminal to another terminal not having the emotion specifying function to enable music corresponding to the emotions to be listened to with the other terminal as well.

Further, the information processing terminal according to the present invention includes a configuration wherein the music output unit outputs and stores the separate music information item, generated by the music synthesizing unit, in a storage device.

With this configuration, music corresponding to the specified emotions can be listened to any number of times.

Effect of the Invention

With the information processing terminal and the music information generating method and program according to the present invention, by specifying emotions from a voice and audio outputting music suitable for the specified emotions, the emotions of a loudspeaker who uttered the voice can be recognized readily.

BRIEF DESCRIPTION OF THE DRAWINGS

FIG. 9 is a conceptual diagram of information items concerning emotions stored by a cell phone according to a second embodiment of the present invention.

DESCRIPTION OF SYMBOLS

Figure 1:
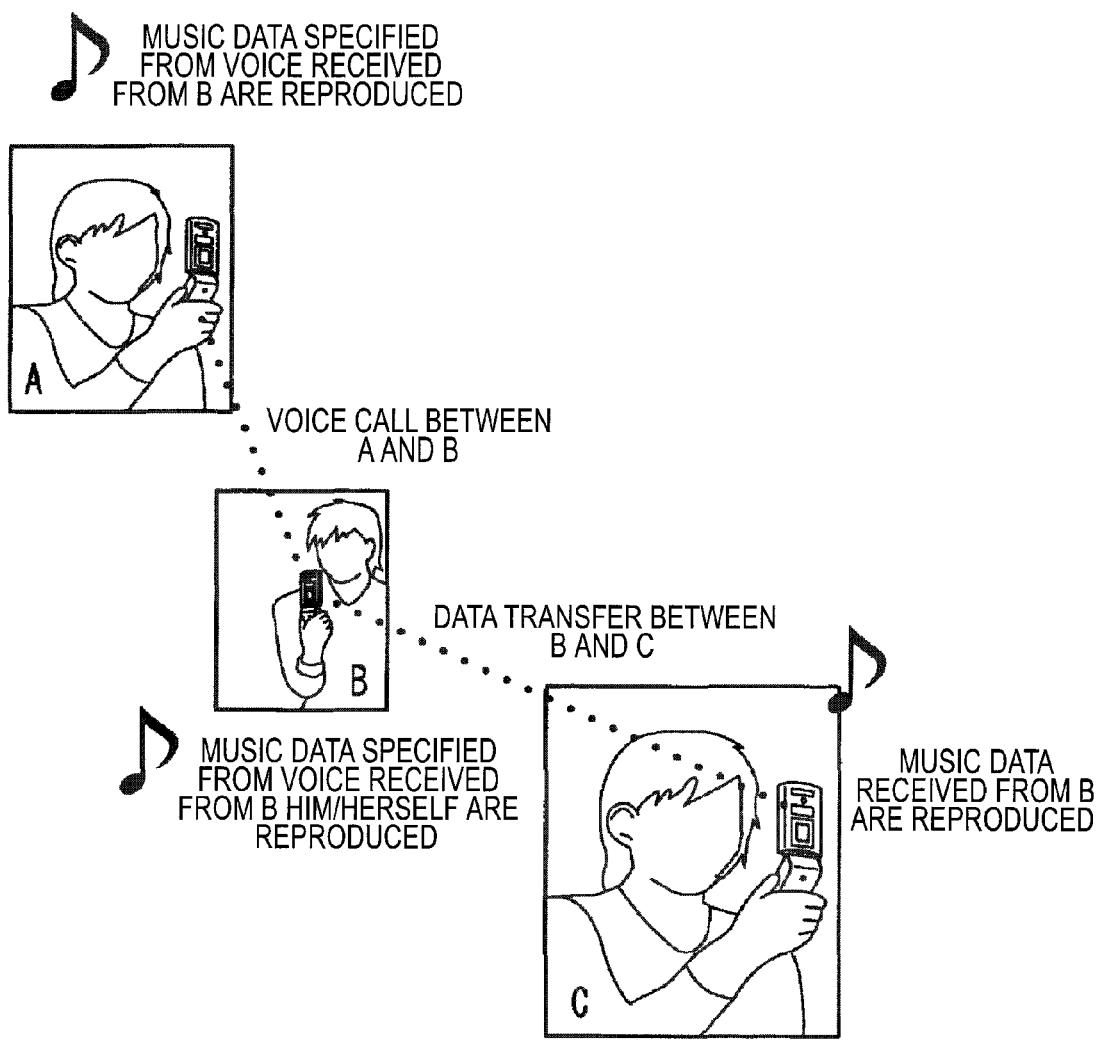
FIG. 1 is a schematic diagram of music information generating processes in processes performed by cell phones according to embodiments of the present invention.

21: Wireless unit
21: RF circuit
212: Baseband circuit
22: Controller
221: CPU
222: ROM
223: RAM
224: A/D circuit
225: D/A circuit
226: LCD controller
227: Input/output control circuit
23: Emotion inferring unit
231: Emotion inferring circuit
232: Emotion history database
24: Music data generating unit
241: Music data generating circuit
242: Music parts database
25: Loudspeaker
26: Microphone
27: Operation keys
28: LCD

BEST MODES FOR CARRYING OUT THE INVENTION

Cell phones shall now be described as examples of an information processing terminal according to the present invention. FIG. 1 is a schematic diagram of music information generating processes in processes performed by cell phones according to embodiments of the present invention. In FIG. 1, each of users A, B, and C uses a cell phone, a voice call by cell phones is performed between the user A and the user B, and data communication by cell phones is carried out between the user B and the user C.

The cell phone used by the user A infers an emotion of the user B from a voice uttered by the user B during the voice call with the cell phone used by the user B. Specifically, the cell phone used by the user A infers, from a voice uttered by a person and specifically from a volume of the voice, a waveform of the voice, a pitch of the voice, phoneme, etc., at least one among the six factors of joy, sadness, surprise, disgust, anger, and fear as an emotion of the user B. Thereafter, the cell phone used by the user A specifies a music data item corresponding to the inferred emotion of the user B from among music data items stored in a memory, an HDD, or other storage device included in the cell phone and allocated for each of the abovementioned factors (a MIDI format can be cited as an example of a data format of the music data item). Upon accepting, from the user A, an operation to reproduce music corresponding to the emotion felt by the user B during voice call with the user B, the cell phone used by the user A reproduces the specified music data item.

By this configuration, the user A can specify, by the music, the emotion felt by the user B during the voice call. By thus expressing an atmosphere of a conversation by music, the cell phone used by the user A can realize a new form of communication wherein connection among persons is expressed by music. With this music, because the process by which the music was generated (that is, the contents of the voice call) is known only by the user A, a feeling of secrecy that only oneself knows leads to further strengthening of attachment to the music.

Meanwhile, as with the cell phone used by the user A, the cell phone used by the user B also infers an emotion of the user A from a voice uttered by the user A during the voice call with the cell phone used by the user A, specifies a music data item corresponding to the inferred emotion of the user A from among music data items stored in a storage device included in the cell phone in advance, and reproduces the specified music data item. Furthermore, the cell phone used by the user B infers an emotion of the user B him/herself from voice uttered by the user B during a voice call with the cell phone used by the user A, specifies a music data item corresponding to the inferred emotion of the user B him/herself from among music data items stored in the memory, HDD, or other storage device included in the cell phone and allocated for each of the abovementioned factors in advance. Upon accepting, from the user B, the operation of reproducing the music corresponding to the emotion felt by the user B him/herself during the voice call with the user A, the cell phone used by the user B reproduces the specified music data item.

By this configuration, the user B can specify, by the music, the emotion felt by the user B him/herself during the voice call. By thus reflecting on the atmosphere of past conversation by the music, the emotion felt by oneself in regard to a called party in a past voice call can be reminisced readily.

The cell phone used by the user C acquires the music data item, corresponding to the emotion of the user B him/herself that was specified by the cell phone used by user B, from the cell phone used by the user B by some form of information transmission means (for example, a wireless communication function, infrared communication function, or transfer of data by a memory medium). By this configuration, the user C can acquire the music data item expressing the emotion of the user B him/herself from the user B who wishes to make the emotion felt during a certain voice call known to another party and can thereby enjoy the music (musical composition) created by the communication of the users A and B, that is, enjoy the music itself.

In a communication among persons, transmission of intention is carried out a number of times among the plurality of persons. Voice calls are carried out a plurality of times among a plurality of users, for example, between the user A and the user B in FIG. 1 in the case of the cell phones of the embodiment of the present invention as well. Obviously, the cell phones used by the user A and the user B can realize the new form of communication wherein connection among persons is expressed by music even when, in each voice call, the emotion of the user A or the user B is inferred, the music data item corresponding to the inferred emotion of the user B is specified, and the music data items specified for the respective voice calls are reproduced solitarily without any relevance to each other. In the following description, a cell phone that can thereafter provide a relationship in the music data items specified for the respective voice calls and reproduce the music data items of the respective voice calls in an associated manner to promote more effective communication shall be described in detail. Although a cell phone shall be described as an example hereinafter, the present invention is not restricted thereto. Any information processing terminal having at least a function of specifying emotions of an utterer from a sound information item, a function of storing music data items corresponding to various emotions, and a function enabling reproduction of music data can be a subject of the present invention.

First Embodiment

Figure 2:
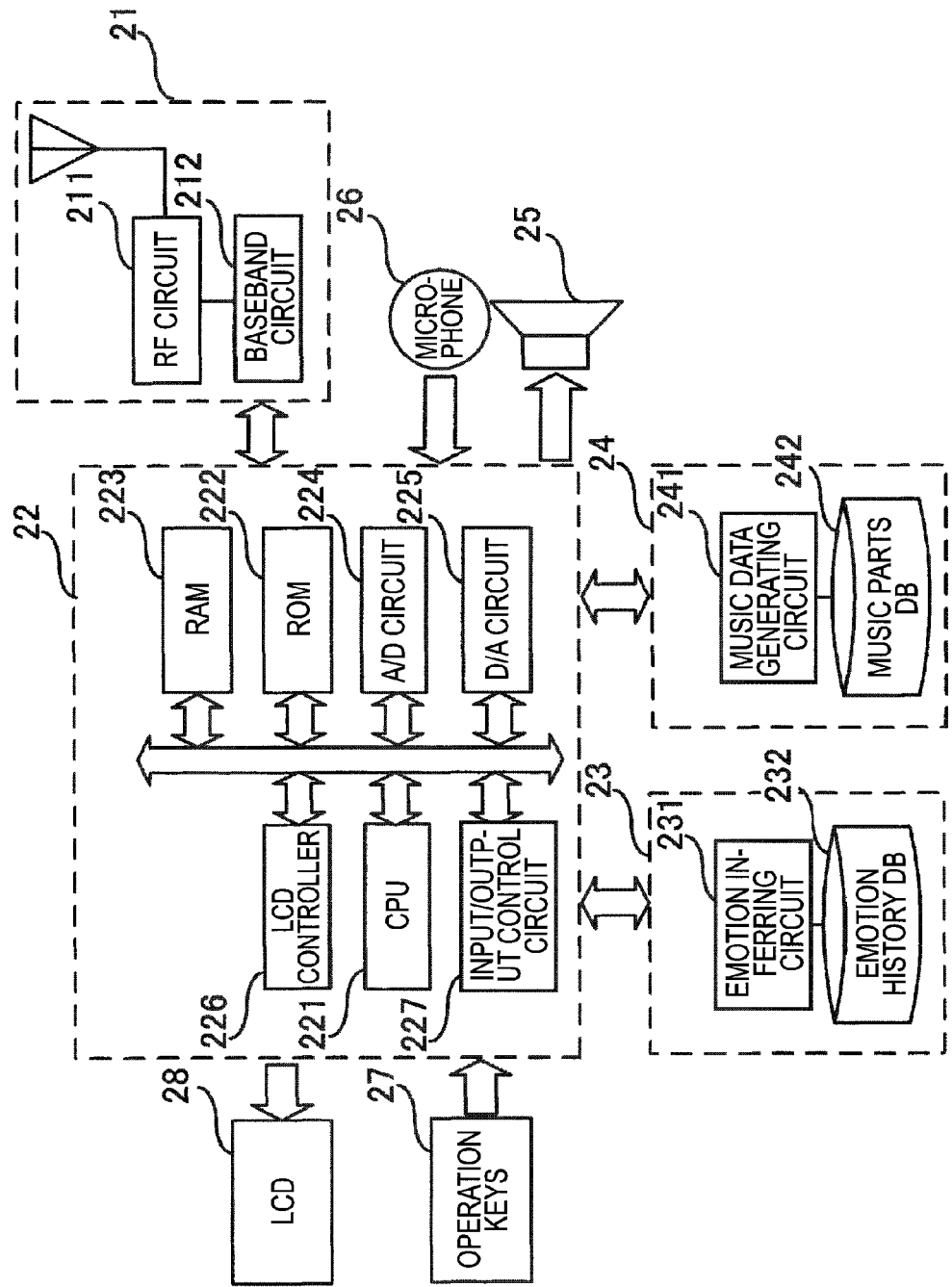
FIG. 2 is a functional block diagram of a cell phone according to a first embodiment of the present invention.

FIG. 2 is a functional block diagram of a cell phone according to a first embodiment of the present invention. The cell phone according to the first embodiment of the present invention includes a wireless unit 21, a controller 22, an emotion inferring unit 23, a music data generating unit 24, a loudspeaker 25, a microphone 26, operation keys 27, and an LCD 28.

The wireless unit 21 includes an RF circuit 211 and a baseband circuit 212. Upon receiving a radio wave of a predetermined frequency band transmitted from a base station for cell phones, the RF circuit 211 demodulates the radio wave and outputs a demodulated signal to the baseband circuit 212. The baseband circuit 212 decodes the input signal and outputs data obtained by decoding to the controller 22. Further, upon inputting, from the controller 22, data to be transmitted to another information processing terminal, the baseband circuit 212 encodes the data and outputs the data to the RF circuit 211. The RF circuit 211 transmits a radio wave, resulting from demodulating a carrier wave used for wireless communication in accordance with the data input from the baseband circuit 212, from an antenna.

The controller 22 includes a CPU 221, a ROM 222, a RAM 223, an A/D circuit 224, a D/A circuit 225, an LCD controller 226, and an input/output circuit 227. The controller 22 performs control of display output to the LCD 28, detection of operations accepted from the operation keys 27, control of audio output to the loudspeaker 25, control of audio input from the microphone 26, control of output of sound data for inferring an emotion to the emotion inferring unit 23, control of input of music data from the music data generating unit 24, etc.

Specific processes performed by the controller 22 shall now be described. The CPU 221 reads programs and data from the ROM 222 and executes data processing based on the programs and the data. Furthermore, upon accepting an operation input from the operation keys 27 via the input/output control circuit 227, which manages sending and receiving of data between the controller 22 and other functional units, the CPU 221 executes data processing that reflects the operation input and stores the data being processed in the RAM 223. The CPU 221 controls the LCD controller 226 to make an image be displayed on the LCD 28 using display data stored in the RAM 223, makes the D/A circuit 225 convert audio output data, resulting from program processing, to an analog signal, and makes the loudspeaker 25 output the analog signal.

Further upon input of sound data (for example, sound data for voice call), the CPU 221 makes the D/A circuit 225 convert the sound data to an analog signal, and makes the loudspeaker 25 output the analog signal. Furthermore, upon input of an electrical signal, including information related to sound, from the microphone 26, the CPU 221 makes the A/D circuit 224 covert the electrical signal to sound data, which are digital data, and outputs the sound data for wireless transmission to the wireless unit 21.

Furthermore, the CPU 221 outputs sound data, input from the wireless unit 21, or sound data, resulting from conversion of an electric signal input from the microphone 26 by the A/D circuit 224, to the emotion inferring unit 23 and makes the emotion inferring unit 23 infer an emotion of an utterer from a voice, uttered by the utterer and included in the sound data. When an information item concerning an emotion (an information item for specifying an emotion such as joy, sadness, surprise, disgust, anger, fear, etc.) is notified from the emotion inferring unit 23, the CPU 221 outputs the information item to the music data generating unit 24. Further, the CPU 221 makes the D/A circuit 225 convert a music data item, input from the music data generating unit 24, to an analog signal and makes the loudspeaker 25 output the analog signal.

Figures 3, 4:
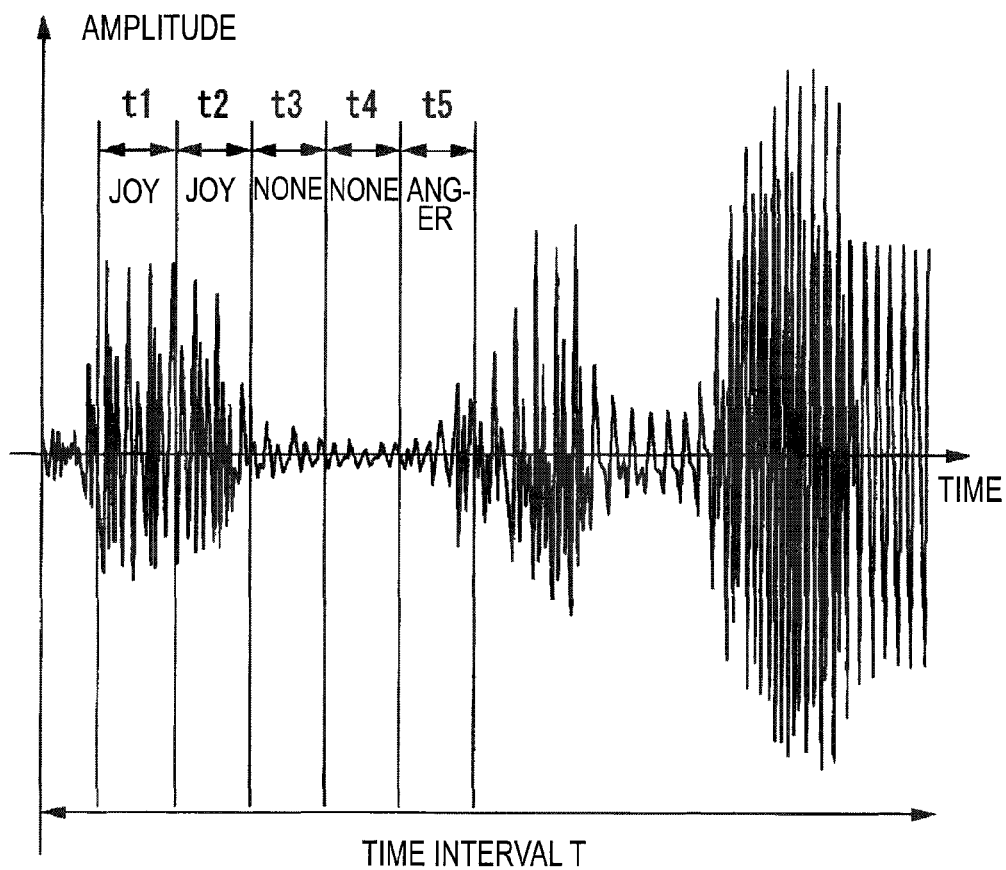
FIG. 3 is a diagram of a relationship of a voice waveform and emotions specified according to respective sections of the voice waveform.
FIG. 4 is a conceptual diagram of information items concerning emotions stored by the cell phone according to the first embodiment of the present invention.

The emotion inferring unit 23 includes an emotion inferring circuit 231 and an emotion history database 232. Upon input of sound data from the controller 22, the emotion inferring unit 231 specifies, from the voice included in the sound data, the emotion of the utterer who uttered the voice and notifies the specified emotion to the controller 22. An example of a method for specifying an emotion from sound data shall now be described with reference to FIG. 3, which is a diagram of a relationship of a voice waveform and emotions specified according to respective sections of the voice waveform. In a case where sound data, taking up a time interval T until end of reproduction, are audio output according to the voice waveform shown in FIG. 3, the voice waveform is divided according to a time interval t of shorter time interval than the time T, and for each voice waveform of the time interval t, matching of the voice waveform and a voice waveform sample, characteristic of vocal expression of an emotion, such as joy, sadness, surprise, disgust, anger, fear, etc., is determined, and if the voice waveform of a certain period of the time interval t is high in similarity with respect to a voice waveform sample, the emotion expressed by the sample is specified as the emotion of the period. In FIG. 3, in respective periods, t1, t2, t3, t4, and t5, each of the time interval t, emotions of the respective periods are specified as "joy," "joy," "none" ("none" does not indicate an emotion but indicates that there are no voice waveform samples corresponding to the waveform of this period), "none," and "anger." After thus specifying the emotions in the respective periods of the voice waveform, the emotion specified in the highest number of periods is specified as a representative emotion of the voice waveform. In the present invention, the method for specifying, from the voice included in the sound data, the emotion of the utterer who uttered the voice is not restricted to the above method.

Each time an emotion is specified, the emotion inferring circuit 231 references a timer (not shown) to acquire a time information item and outputs the time information item and the information item concerning the specified emotion to the emotion history database 232 to store the information item concerning the specified emotion in association with the time information item. A time information item expressing a point in time at which a voice call was started may be input from the controller 22 or, in a case where the specifying of emotion is to be performed after the end of a voice call, a time information item expressing a point in time at which the voice call was ended may be input from the controller 22. FIG. 4 is a conceptual diagram of information items concerning emotions stored by the cell phone according to the first embodiment of the present invention.

Figure 5:
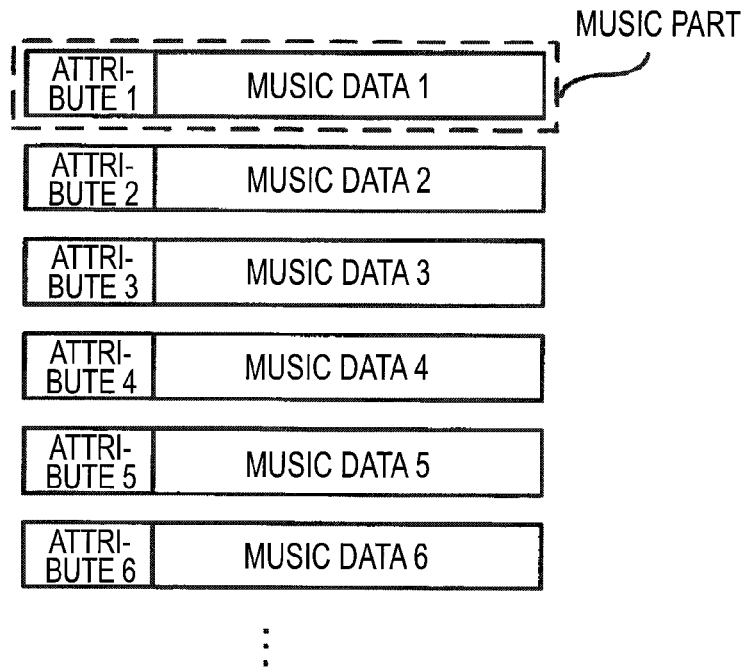
FIG. 5 is a conceptual diagram of music parts stored by the cell phone according to the first embodiment of the present invention.

The music data generating unit 24 includes a music data generating circuit 241 and a music parts database 242. The music data generating circuit 241 reads at least two music data items from among a plurality of music data items (the format of which is, for example, the MIDI format) stored in the music parts database 242 and synthesizes the music data items read. A music data synthesizing process by the music data generating circuit 241 and music parts stored in the music parts database 242 shall now be described. First, the music parts stored in the music parts database 242 shall be described. FIG. 5 is a conceptual diagram of the music parts stored by the cell phone according to the first embodiment of the present invention.

First, a music part is a data item made up of a music data item. A music part has an information item concerning an emotion, for example, one emotion among joy, sadness, surprise, disgust, anger, and fear allocated thereto as an attribute, and the music data item making up the music part has data contents such that the music that is audio output upon reproduction makes a listener bring to mind the attribute. As shown in FIG. 4, the music database 242 stores a plurality of music parts, and each music part is made up of a music data item n (n=1, 2, ..., 6) and an attribute n (n=1: "joy"; n=2: "sadness"; n=3: "surprise"; n=4: "disgust"; n=5: "anger"; and n=6: "fear"). Upon being notified of an emotion information item from the music data generating circuit 241, the music parts database 242 returns a music data item, to which the attribute corresponding to the emotion information item is allocated, to the music data generating circuit 241. Music contents of a music data item shall be described below in a description related to processing by the music data generating circuit 241.

Figure 6:
FIG. 6 shows examples of musical scores for describing a music data synthesizing process by the cell phone according to the first embodiment of the present invention.

Upon being notified of an information item concerning an emotion from the controller 22, the music data generating circuit 241 requests the music parts database 242 to return a music data item, to which the information item concerning the emotion is allocated as the attribute. Thereafter, the music data generating circuit 241 acquires the music data item from the music parts database 242. In this process, in a case where the controller 22 notifies a single information item concerning an emotion, the music data generating circuit 241 acquires a single music data item, to which the information item concerning the emotion is allocated as the attribute, from the music parts database 242 and outputs the single music data item to the controller 22. On the other hand, in a case where the controller 22 notifies two or more information items concerning emotions (for example, emotions concerning joy and surprise), the music data generating circuit 241 acquires two music data items, to which the information items concerning those emotions are respectively allocated as the attributes, from the music parts database 242, generates a separate music data item in which the two music data items are synthesized, and outputs the separate music data item to the controller 22. An example of a method by which the music data generating circuit 241 synthesizes two music data items shall now be described. FIG. 6 shows examples of musical scores for describing the music data synthesizing process by the cell phone according to the first embodiment of the present invention.

In a comparison of the musical scores shown in FIGS. 6A to 6C, a listener will have completely different impressions when these scores are played. However, when these scores are compared in phrase units, it can be seen that a first bar of the musical composition of FIG. 6A is the same phrase FA as a portion of a second bar of the musical composition of FIG. 6B, and a first bar of the musical composition of FIG. 6B is the same phrase FC as first and second bars of the musical composition of FIG. 6C. In view of these points, even in a case where the impressions that a listener has are completely different, when individual phrases in respective musical compositions are compared, it can be seen that phrases in common are used in a plurality of musical compositions in many cases. Thus by extracting individual phrases from existing musical compositions and lining up the phrases, a new musical composition can be generated. For example, by joining the phrase FC with a phrase FB of the musical composition of FIG. 6A, the new musical composition of FIG. 6D is generated, and by joining the phrase FA, a pause, and a phrase FD of the musical composition of the FIG. 6C, the new musical composition of FIG. 6E is generated. The musical compositions of FIGS. 6D and 6E both have adequate degrees of musical completeness. This method for generating new musical compositions is applied to the music data synthesizing process by the cell phone according to the first embodiment of the present invention.

That is, in a case where the phrase FB in the musical composition of FIG. 6A corresponds to a music data item expressing the emotion of "joy" and the phrase FC in the musical composition of FIG. 6B corresponds to a music data item expressing the emotion of "surprise," the music data generating circuit 241, upon being notified of information items concerning the emotions of "surprise" and "joy" from the controller 22, acquires the music data item of the phrase FC with the attribute of "surprise" and the music data item of the phrase FB with the attribute of "joy" from the music parts database 242. Thereafter, the music data generating circuit 241 outputs the new musical composition of FIG. 6D, in which the music data item of the phrase FC and the music data item of the phrase FB are joined in the order of: 1. the music data item of the phrase FC, 2. the music data item of the phrase FB, to the controller 22.

Figure 7:
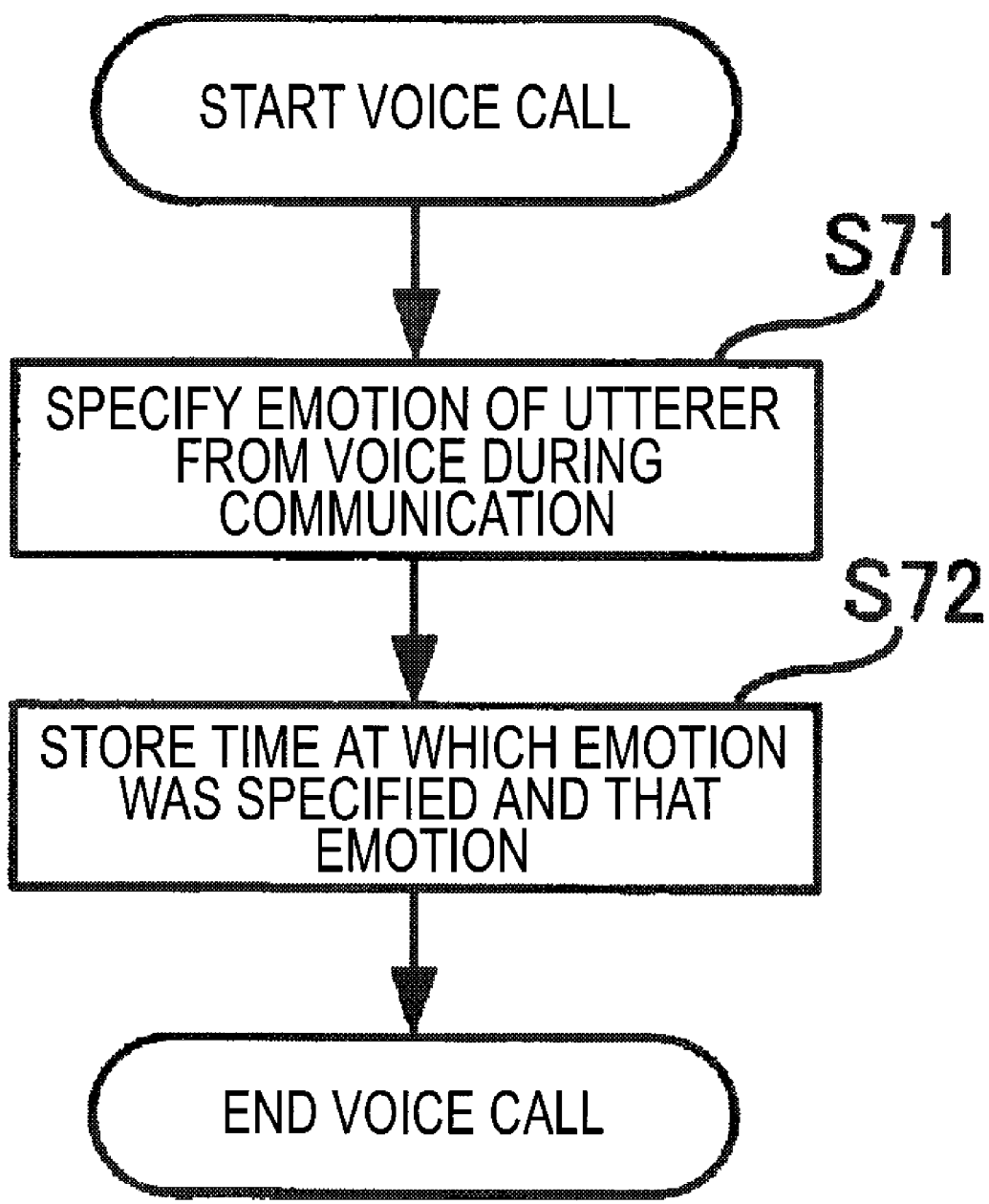
FIG. 7 is a flowchart of a flow of an emotion inferring process by the cell phone according to the first embodiment of the present invention.

A flow of an emotion inferring process by the cell phone according to the first embodiment of the present invention having the configuration described above shall now be described. FIG. 7 is a flowchart of the flow of the emotion inferring process by the cell phone according to the first embodiment of the present invention. Here, a case where an emotion of a called party is specified from sound information transmitted from the called party by a voice call shall be described. In a case where the emotion inferring process is performed on a cell phone user him/herself, just an input source of the sound information on which the emotion inferring process is to be performed differs and the same process as that described below is performed.

When a voice call is started, the cell phone uses voice call sound data transmitted from the called party to infer emotion (step S71). Here, the cell phone may continue the emotion inferring process during a period from a start of the voice call to an end of the voice call or may perform the emotion inferring process only during a fixed period (for example, for a predetermined duration having the start of the voice call as a starting point). When the cell phone specifies a certain emotion from the sound data, the cell phone stores a time information item, expressing a point in time at which the emotion was specified, and the emotion in the emotion history database 232 (step S72). When the communication ends, the cell phone ends the emotion inferring process for this voice call. Thereafter, when another voice call starts, the cell phone repeats the same process.

Figure 8:
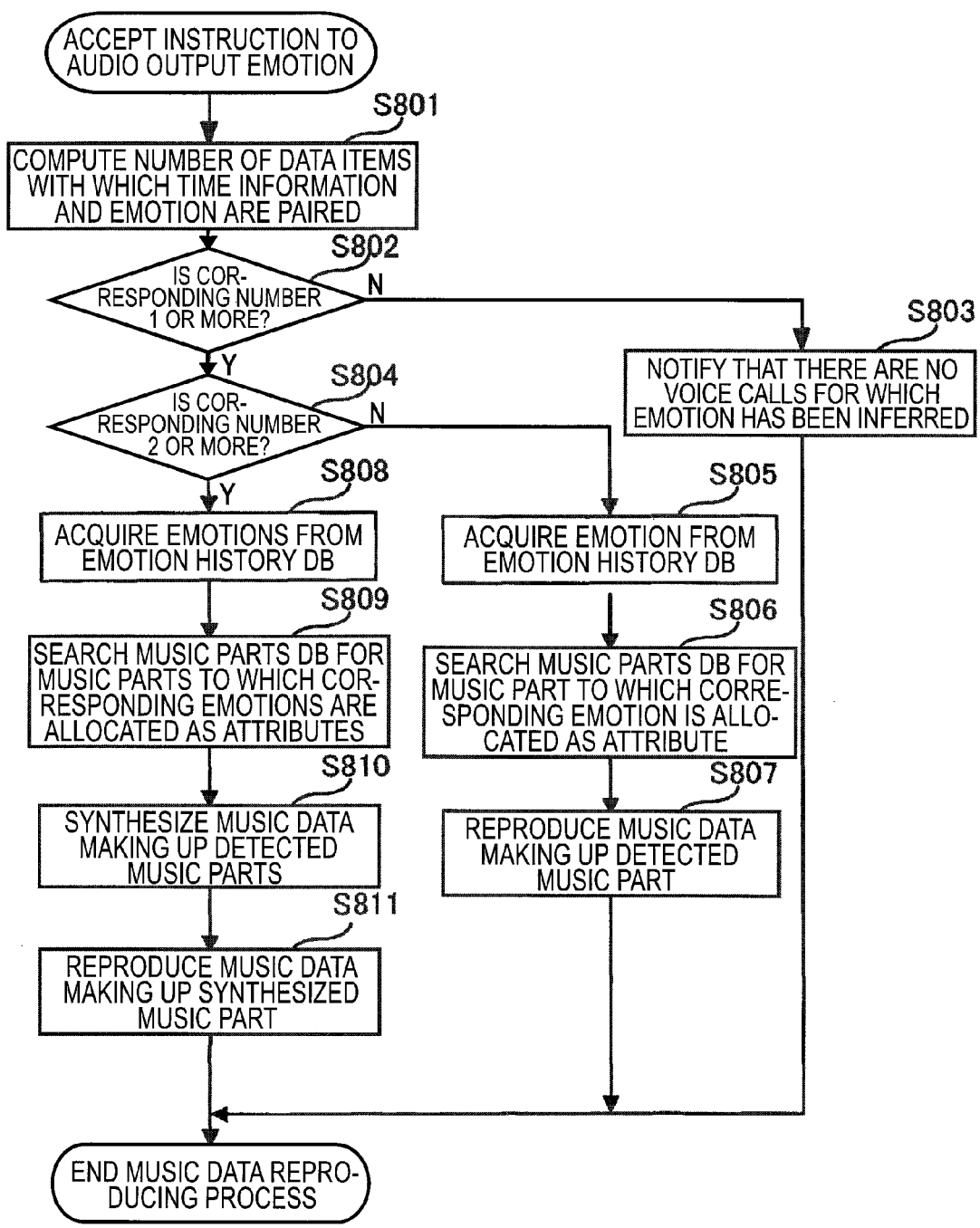
FIG. 8 is a flowchart of a flow of a music data reproducing process by the cell phone according to the first embodiment of the present invention.

A flow of a music data reproducing process by the cell phone according to the first embodiment of the present invention shall now be described. FIG. 8 is a flowchart of the flow of the music data reproducing process by the cell phone according to the first embodiment of the present invention. Upon accepting an instruction, made by operation of the operation keys 27, to audio output emotions felt by a called party in voice calls carried out in the past, the cell phone computes a number of data items, stored in the emotion history database 232 and in each of which a time information item and an emotion are paired (step S801). If the number of data items, in which a time information item and an emotion are paired, is zero (step S802, NO), the cell phone makes the LCD 28 display a screen notifying the cell phone user that there are no voice calls for which emotion inferring was performed (step S803). If the number of data items, in which a time information item and an emotion are paired, is one (step S802, YES and step S804, NO), the cell phone acquires the information item concerning the emotion from the emotion history database 232 (step S805), searches the music parts database 242 for a music part to which the information item concerning the emotion is allocated as the attribute (step S806), and reproduces the music data item that makes up the detected music part (step S807). If the number of data items, in each of which a time information item and an emotion are paired, is two or more (step S804, YES), the cell phone acquires the respective information items concerning the emotions from the emotion history database 232 (step S808), searches the music parts database 242 for respective music parts to which the information items concerning the emotions are allocated as the attributes (step S809), synthesizes the music data items making up the detected music parts (music data items of the same number as the number of the data items, in each of which a time information item and an emotion are paired) to generate a single music data item (step S810), and reproduces the generated music data item (step S811). In a case where a plurality of music data items are to be synthesized, for example, in a case where music data items making up music parts to which the attributes of "joy," "surprise," and "anger" are allocated are to be synthesized, these music data items are lined up and synthesized in ascending order or descending order based on the time information items corresponding to the respective attributes. If the data items are lined up in the ascending order, music expressing a more previous emotion is reproduced first, and if the data items are lined up in the descending order, music expressing a most recent emotion is reproduced first.

Besides a rule of lining up a plurality of music data items in the ascending order or the descending order based on the time information items corresponding to the respective attributes, a rule of lining up the music data items according to a magnitude of a length of a call duration stored as the time information item (that is, the period from the point at which a voice call was started to the point at which the voice call was ended; in this case each time an emotion is specified, the call duration is stored as the time information item in the emotion history database 232) may be employed, or a rule of realigning the music data items according to a day of the week in which a call was made that is stored as the time information item (that is, the day of the week at which a voice call was started; in this case, each time an emotion is specified, the day of the week of the call is stored as the time information item in the emotion history database 232), for example, in an order from Monday to Sunday may be employed, or these rules of lining up the music data items may be combined. The music data items may also be realigned arbitrarily by a cell phone user according to an operation by the cell phone user.

In reproducing a music data item making up a music part, the cell phone may reproduce the music data item with a mode of rendition of the music data item being changed according to the date of the time information item at which the attribute allocated to the music part was specified. For example, if the date of the time information item is December 24, the mode of rendition is changed to a musical box type mode. With this configuration, contents of a past call can be reminisced more readily by reproduction of music.

As described above, with the cell phone according to the embodiment of the present invention, by specifying an emotion of a called party from a voice call and performing audio output of music suited to the specified emotion, the emotion of the utterer who uttered the voice can be recognized readily, and furthermore, in a case where voice call were made at least two times, by specifying the emotions of the called party in the voices of the respective calls and generating and reproducing new music data item by synthesizing music suited to the specified emotions, a series of changes of emotions of the called party can be recognized in a single occasion. Further, because music data items of various combinations can be generated anew, an aspect of improving entertainment by enabling preparation of original voice data items unique to the user him/herself is provided.

Although in the description of the information processing terminal according to the present invention, an emotion of an utterer who uttered a voice is specified based on sound information, acquired by a voice call by a cell phone and including the voice, a means for inputting the sound information is not restricted to a voice call, and the present invention can also be realized by inputting from sound information picked up by a microphone, sound information stored in a memory medium, etc.

Second Embodiment

A cell phone according to a second embodiment of the present information shall now be described. In the cell phone according to the first embodiment of the present invention, in recording, in the emotion history database 232, an information item concerning an emotion specified by the emotion inferring circuit 231, the information item concerning the emotion and the time information item indicating the time at which the emotion was specified were recorded. With the cell phone according to the second embodiment of the present invention, a configuration wherein an information item concerning an utterer who expressed the emotion is also recorded in the emotion history database 232 shall be described. Because besides the point that new processes are added to the processes performed by the controller 22 and the emotion inferring unit 23, the configuration of the cell phone according to the second embodiment of the present invention is the same as the configuration of the first embodiment described with reference to FIG. 2, the description shall be abbreviated.

Upon receiving a telephone number of a call destination transmitted from a base station via the wireless unit 21 as a process for starting a voice call, the CPU 221 of the controller 22 references phonebook information items, stored in the RAM 223 and which recent cell phones have as a function, to specify personal information items corresponding to the telephone number, and outputs, from among the personal information items, an information item enabling specifying of the called party (for example, a name, affiliated group, address, etc.) to the emotion inferring unit 23.

Upon input of sound data from the controller 22, the emotion inferring unit 231 specifies, from a voice included in the sound data, an emotion of an utterer who uttered the voice (process of step S71 of FIG. 7). Each time an emotion is specified, the emotion inferring circuit 231 references the timer (not shown) to acquire the time information item and outputs the time information item, the information item concerning the specified emotion, and the information item, enabling specifying of the called party and input from the controller 22, to the emotion history database 232. The emotion history database 232 generates and renews, for each information item enabling specifying of the called party, a personal data table made up of the time information item and the information item concerning the emotion (process of step S72 of FIG. 7). The time information item expressing the point in time at which the voice call was started may be input from the controller 22 or, in the case where the specifying of emotion is to be performed after the end of the voice call, the time information item expressing the point in time at which the voice call was ended may be input from the controller 22. FIG. 9 is a conceptual diagram of the information items concerning emotions stored by the cell phone according to the second embodiment of the present invention. In FIG. 9, the name, which is extremely high in frequency of use for identifying personal information in a phonebook function, is indicated as the information item enabling specifying of the called party. Besides the name, group tables, made up of the time information item and the information item concerning the emotion, may be generated and renewed according to affiliated group.

Figure 10:
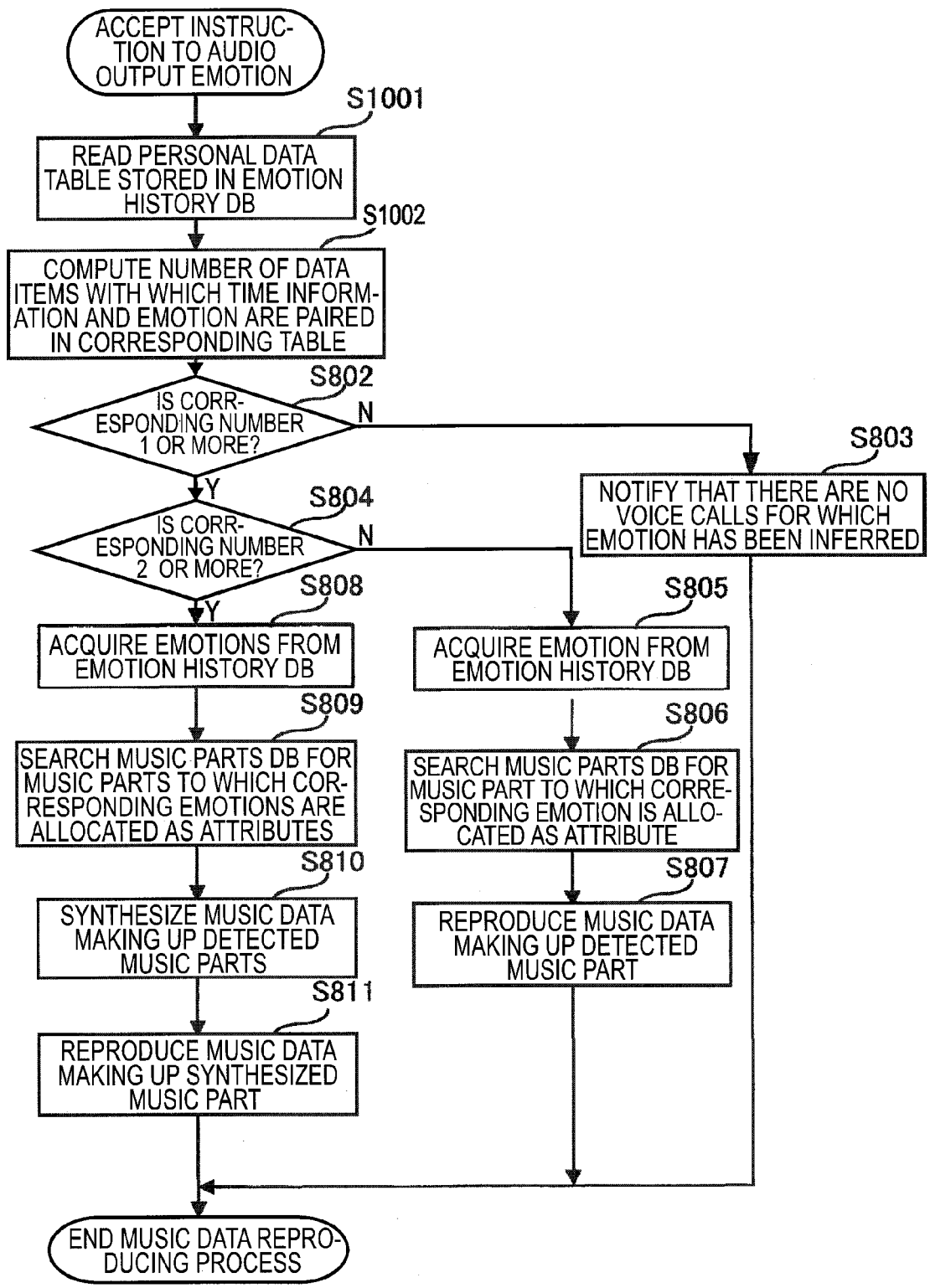
FIG. 10 is a flowchart of a flow of a music data reproducing process by the cell phone according to the second embodiment of the present invention.

A flow of processing by the cell phone according to the second embodiment of the present invention having the configuration described above shall now be described. FIG. 10 is a flowchart of the flow of the music data reproducing process by the cell phone according to the second embodiment of the present invention. Because besides the difference in the data contents recorded in the emotion history database 232, the emotion inferring process by the cell phone according to the second embodiment of the present invention is the same as the emotion inferring process described with the first embodiment, the description shall be abbreviated. Further, because in the flowchart of FIG. 10, the flow of portions to which the same reference symbols as those of the flowchart of FIG. 8 are assigned is as has been described with the first embodiment, description thereof shall be omitted.

Upon accepting an instruction, made by operation of the operation keys 27, to audio output emotions felt by a called party in voice calls carried out in the past and accepting an operation designating the called party, the cell phone reads the personal data table stored in the emotion history database 232 (step S1001), and computes the number of data items, stored in the personal data table and in each of which a time information item and an emotion are paired (step S1002). The subsequent process is the same as the process of step S803 to step S811 described with the first embodiment.

As described above, with the cell phone according to the second embodiment of the present invention, by generating and reproducing a new music data item by synthesizing music suited to emotions expressed in respective communications by a specific called party among called parties, with which voice calls were made and emotions were specified from the voices thereof, a series of changes of emotions of the specific called party can be recognized in a single occasion.

Third Embodiment

A cell phone according to a third embodiment of the present invention shall now be described. In the cell phones according to the first and second embodiments of the present invention, the information item concerning an emotion stored in the emotion history database 232 was that specified by the emotion inferring circuit 231. Thus with a cell phone not having the emotion inferring circuit 231, music expressing a certain emotion could not be listened to. With the cell phone according to the third embodiment of the present invention, a cell phone, with which music expressing a certain emotion can be listened to even without having the emotion inferring circuit 231, shall be described. Because besides the points that new processes are added to the processes performed by the controller 22 and that the emotion inferring circuit 231 is unnecessary, the configuration of the cell phone according to the third embodiment of the present invention is the same as the configuration of the first embodiment described with reference to FIG. 2, the description shall be abbreviated.

The cell phone according to the third embodiment of the present invention performs communication with a cell phone according to the first or second embodiment of the present invention and acquires time information items and information items concerning emotion that the cell phone according to the first or second embodiment of the present invention stores in the emotion history database 232. That is, with the cell phone according to the third embodiment of the present invention, the CPU 221 stores time information items and information items concerning emotion received from another cell phone via the wireless unit 21 in the emotion history database 232. With this configuration, music expressing a certain emotion can be listened to even if the emotion inferring circuit 231 is not provided. An aspect that an emotion felt by another cell phone user can be shared is also provided. In a case where the cell phone according to the third embodiment of the present invention has neither the emotion inferring unit 23 nor the music data generating units 32, arrangements are made to acquire a music data item synthesized by a cell phone according to the first or second embodiment of the present invention and reproduced the music data item. A method for acquiring time information items and information items concerning emotion from another cell phone by the cell phone according to the third embodiment of the present invention is not restricted to the above, and transfer of data by a wireless communication function, by an infrared communication function, or by a memory medium, etc., can be considered.

Figure 11:
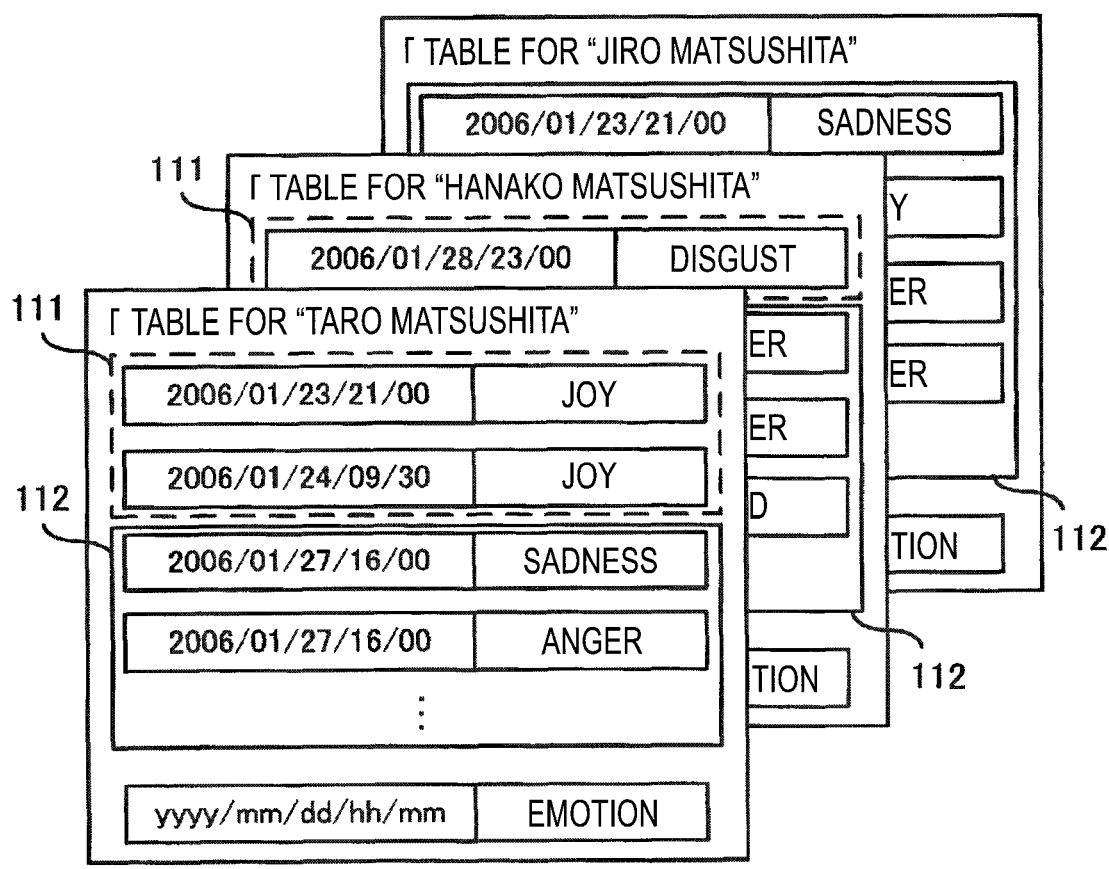
FIG. 11 is a conceptual diagram of information items concerning emotions stored by a cell phone according to a third embodiment of the present invention.

Furthermore, although with the third embodiment up until now, a cell phone not having the emotion inferring circuit 231, which specifies, from a voice included in sound information, an emotion of an utterer of the voice, was described, by configuring a cell phone according to the first or second embodiment of the present invention that includes the emotion inferring circuit 231 to acquire, in the manner described above, time information items and information items concerning emotion that are stored in the emotion history database 232 of another cell phone, the cell phone according to the first or second embodiment of the present invention can realize the following. FIG. 11 is a conceptual diagram of information items concerning emotions stored by the cell phone according to the third embodiment of the present invention.

That is, the cell phone of the first or second embodiment of the present invention acquires an information item 111 concerning time information and emotion (an information item surrounded by dotted lines in each personal data table in FIG. 11) of a certain individual (a case where this individual is the same as the cell phone user is included) from another cell phone, records the information item 111 in the emotion history database 232, and thereafter furthermore records, in the same personal data table in the emotion history database 232, emotions, expressed by the same individual and specified from calls with the individual by the emotion inferring circuit 231 equipped in the terminal per se, and time information items (information items of a portion surrounded by solid lines in each personal data table in FIG. 11). With this configuration, once the information item 111, concerning the emotions that had been specified by the cell phone used by the user B from calls of the user A and the user B in FIG. 1, is acquired from the cell phone used by the user B, the cell phone used by the user C can join the acquired information item 111 concerning the emotions with an information item 112 concerning emotions specified anew from calls with the user B to generate yet another separate music data item. Consequently, an entertainment property not seen in cell phones up until now of nurturing music data can be provided to users.

As described above, with the cell phone according to the third embodiment of the present invention, music expressing a certain emotion can be listened to even with a cell phone not having a function of specifying, from a voice included in sound information, an emotion of an utterer of the voice.

Although with the cell phones according to the first to third embodiments of the present invention, it was described that the music data generating unit 24 generates a music data item each time the instruction for performing audio output of emotions felt by a called party according to voice calls carried out in the past is accepted from the operation keys 27, a music data item that has been generated once may be stored in the storage device included in the cell phone. In this case, the MIDI format is preferable as the format of the music data item. With this configuration, in a case where, in a process of specifying emotions upon carrying out voice call a plurality of times, a music data item generated according to emotions up to a certain point in time is favorable for the cell phone user but a music data item generated by inclusion of emotions subsequent the certain point in time is not favorable for the cell phone user, just the music that is favorable for the cell phone user can be left by storing once the music data item generated according to the emotions up to the certain point in time. Further, in a case where the music data item generated according to the emotions up to the certain point in time is stored once, arrangements may be made to delete the information items concerning the emotions up to the certain point in time from the emotion history database 232.

In the case where the music data item generated according to the emotions up to the certain point in time is stored once, arrangements may be made to input a character string, by which the emotions up to the certain point in time can be specified, as a name of the music data item. For example, in a case where the information items "joy," "surprise," and "fear" concerning emotions up to a certain point in time (the order here shall be an ascending order) are allocated as attributes, a name, such as "2006/06/23_joysurprisefear.***," is set as the name. The cell phone user may set the name uniquely, or a name, affiliated group name, etc., from personal information recorded in a phonebook may also be set in the name.

Arrangements may be made so that by a cell phone according to any of the first to third embodiments of the present invention, a music data item is generated each time a voice call ends and the generated music data item is reproduced to enjoy the afterglow of the conversation by the music after the voice call. Further, arrangements can be made so that when a call history or a phonebook is being checked, a music data item is generated based on emotions obtained from voice calls made up until then with a certain individual selected from the phonebook or with a plurality of called parties listed in the call history and the generated music data item is reproduced to enable past conversations with a recently called party or a certain individual to be reflected back on readily. In a case where the music data item cannot be reproduced due to the cell phone being set to a manner mode, that the music data item cannot be reproduced may be displayed on the LCD 28.

As applications of the music data item generated by cell phone according to any of the first to third embodiments of the present invention, a ringtone or alarm tone of the cell phone, a notification tone that is sounded when the cell phone is placed on a cell phone charger, etc., can be considered.

When, in generating a music data item by a cell phone according to any of the first to third embodiments of the present invention, there are too many emotions up to a certain point in time and a reproduction time of the music data item becomes too long when the music data item is generated (when the data amount becomes large), the music data item is preferably generated using a predetermined number of emotions starting from the newest (or oldest) emotion among the emotions up to the certain point in time. Although an effect in terms of reflecting back on past conversations becomes slightly suppressed in this case, the music data item may also be generated according to emotions selected randomly from among emotions up to the certain point in time.

Further, although with the cell phones according to the first to third embodiments of the present invention an emotion of an utterer of a voice included in sound information that has been specified from the sound information is notified to a user by music, in combination, an image expressing the emotion favorably may be displayed on the LCD 28, an LED may be lit up according to colors matched to the emotion, or the LED may be flashed according to a rhythm of the music generated according to the emotion of the utterer.

Fourth Embodiment

With the cell phones according to the first to third embodiments of the present invention, a configuration that specifies, from sound information (in particular, sound information input during voice call), an emotion of an utterer of a voice included in the sound information was described. With a fourth embodiment, a configuration example of a cell phone that specifies, from other information differing from sound information an emotion of a person generating the other information shall be described.

Methods for inferring a person's emotion from a character or text written by the person and methods of inferring a person's emotion from a facial image of the person included in an image have come to be known in recent years. As examples of inferring an emotion of a person who wrote a character or a text, there are known methods, where, in accordance with presence or non-presence of character information, such as a specific symbol or a character string with which a single mark is formed by a plurality of symbols (also referred to at times as an "emoticon"), an emotion associated with the symbol or the character string is inferred as an emotion of a person who wrote the symbol or character string, and methods where, in accordance with presence or non-presence of a specific term among terms making up a text, an emotion associated with the term is inferred as an emotion of a person who wrote the text. In a case where, in a text, there are a plurality of types of specific symbols or character strings with which a single mark is formed by a plurality of symbols, or a plurality of types of specific terms are included among terms making up the text, an emotion of a person who wrote the text is inferred comprehensively from the respective emotions inferred (for example, by deeming an emotion that is inferred the highest number of times to be a representative emotion of the person who wrote the text, etc.).

As an example of inferring an emotion of a person whose face image is included in an image, a method of extracting a region of the face included in the image (which may be either a still image or a moving image), determining matching of the extracted face region with pre-registered template images expressing respective human emotions, and inferring an emotion corresponding to the template image of a highest degree of similarity as the emotion expressed by the face can be cited. As another example, there is known a method of setting characteristic points for brows, eyes, mouth, and other portions in an image of a face included in a moving image and inferring an emotion from changes of positions of a plurality of the characteristic points with an elapse of time.

With the cell phone according to the fourth embodiment of the present invention, from character data, moving image data, or other data, an emotion of a person who prepared a text made up of the character data or an emotion of a person included in an image reproduced from the moving image data is inferred. In a subsequent process, as in the cell phone according to the first and second embodiments of the present invention a music data item corresponding to the inferred emotion is specified from among the music data items, stored in the memory, HDD, or other storage device included in the cell phone and allocated according to the emotions in advance, and upon accepting, from the cell phone user, an operation to reproduce the music corresponding to the emotion, the specified music data item is reproduced. A configuration of the cell phone according to the fourth embodiment of the present invention and processing by the cell phone shall now be described. Because besides the points that new data are stored in the ROM 222 or the RAM 223 of the controller 22 and the emotion inferring process by the emotion inferring unit 23 differs from that of the first to third embodiments, the configuration of the cell phone according to the fourth embodiment of the present invention is the same as the configuration of the first embodiment described with reference to FIG. 2, the description of the other portions shall be omitted. First, a configuration for inferring, from character data, an emotion of a person who prepared a text made up of the character data shall be described.

The controller 22 stores character data in the ROM 222 and the RAM 223. As a process for storing the character data in the ROM 222 or the RAM 223, a process, such as storing character data input by character input operations using the operation keys 27, storing character data included in a mail title or a mail text of an electronic mail received via the wireless unit 21, etc., can be considered. The CPU 221 outputs the character data stored in the ROM 222 or the RAM 223 to the emotion inferring unit 23 and makes the emotion inferring unit 23 infer an emotion of a person who prepared a text made up of the character data.

Upon inputting the character data from the controller 22, the emotion inferring circuit 231 of the emotion inferring unit 23, specifies, according to presence or non-presence in the character data of a specific symbol or a character string with which a single mark is formed by a plurality of symbols, an emotion associated with the symbol or the character string as an emotion of a person who wrote the symbol or character string, or specifies, in accordance with presence or non-presence of a specific term among terms making up a certain text, an emotion associated with the term as an emotion of a person who wrote the text, and notifies the specified emotion to the controller 22.

Each time an emotion is specified, the emotion inferring circuit 231 references the timer (not shown) to acquire a time information item and outputs the time information item and the information item concerning the specified emotion to the emotion history database 232 to make the information item concerning the specified emotion be stored in association with the time information item. A time information item, expressing a point in time at which a series of character inputting operations using the operation keys 27 was completed, or a time information item, expressing a point in time at which an electronic mail was received or a point in time at which an electronic mail was transmitted, may be input from the controller 22. Furthermore, in a case where an emotion is to be specified from a text included in an electronic mail, phonebook information items, stored in the RAM 223 and which recent cell phones have as a function, may be referenced to specify personal information items corresponding to an electronic mail address of a transmission source of the electronic mail, and an information item, among the personal information items, enabling specifying of the party who transmitted the electronic mail (for example, a name, affiliated group, address, etc.) may be output to the emotion inferring unit 23 in a manner similar to the process described with the second embodiment. Processing subsequent the storage into the emotion history database 232 by the cell phone according to the fourth embodiment of the present invention is the same as that in the first embodiment described with reference to the flowchart of FIG. 8.

A configuration for specifying, from a face image included in image data, an emotion of person whose face was captured shall now be described. The image data here may either be still image data or moving image data. The controller 22 stores the image data in the ROM 222 or the RAM 223. As a process for storing the image data in the ROM 222 or the RAM 223, a process, such as storing of still image data or moving image data captured by a camera built into recent cell phones, storing of image data attached to an electronic mail received via the wireless unit 21, storing of moving image data input during TV phoning, etc., can be considered. The CPU 221 outputs the image data stored in the ROM 222 or the RAM 223 to the emotion inferring unit 23 and makes the emotion inferring unit 23 infer an emotion of a person whose face was captured from the face image included in the image data.

Upon inputting the image data from the controller 22, the emotion inferring circuit 231 of the emotion inferring unit 23 extracts a region of the face included in the image, determines matching of the extracted face region with pre-registered template images expressing respective human emotions, and specifies an emotion corresponding to the template image of a highest degree of similarity as the emotion expressed by the face. Or, characteristic points are set for brows, eyes, mouth, and other portions in an image of the face included in the moving image data, an emotion is specified from changes of positions of a plurality of the characteristic points with elapse of time, and the specified emotion is notified to the controller 22.

Each time an emotion is specified, the emotion inferring circuit 231 references the timer (not shown) to acquire a time information item and outputs the time information item and the information item concerning the specified emotion to the emotion history database 232 to make the information item concerning the specified emotion be stored in association with the time information item. A time information item expressing a point in time at which a series of image taking by a camera built into recent cell phones was completed, a time information item expressing a point in time at which an electronic mail, to which the image data are attached, was received or a point in time at which the electronic mail was transmitted, or an index information item, included in the image data and expressing a date and time of image capturing, may be input from the controller 22. Furthermore, in a case where an emotion is to be specified from image data attached to an electronic mail, phonebook information items, stored in the RAM 223 and which recent cell phones have as a function, may be referenced to specify personal information items corresponding to an electronic mail address of a transmission source of the electronic mail, and an information item, among the personal information items, enabling specifying of the party who transmitted the electronic mail (for example, a name, affiliated group, address, etc.) may be output to the emotion inferring unit 23 in a manner similar to the process described with the second embodiment. Processing subsequent the storage into the emotion history database 232 by the cell phone according to the fourth embodiment of the present invention is the same as that in the first embodiment described with reference to the flowchart of FIG. 8.

With the cell phone according to the fourth embodiment of the present invention, as a result of being able to apply various emotion specifying processes that differ in the information referenced to specify emotion, not only the cell phone described in the embodiment but various other electronic devices can also be made applicable as products applicable to the present invention.

Although the present invention has been described in detail and with reference to specific embodiments, it is obvious to one skilled in the art that various changes and modifications can be added without departure from the spirit and scope of the present invention.

The present application is based on a Japanese Patent Application filed on Sep. 8, 2006 (Japanese Patent Application No. 2006-243863), the contents of which are incorporated herein by reference.

INDUSTRIAL APPLICABILITY

The information processing terminal and the music information generating method and program according to the present invention provide an effect of enabling a emotion of a loudspeaker who uttered a voice to be recognized readily by specifying the emotion from the voice and audio outputting a music suitable for the specified emotion, and is useful in a field of information processing terminals that synthesize at least two music information items, made up of music data (a WAV format, MIDI format, MP3 format, etc., can be cited as examples of data formats of the music data).

The invention claimed is:

1. An information processing terminal comprising:
an emotion detecting unit which detects, from an emotion specifying information item including information enabling specifying of emotions, emotion included in the emotion specifying information item;
a music storage unit which stores music information items corresponding to emotions expressed by humans;
a music synthesizing unit which synthesizes at least two of the music information items stored in the music storage unit to produce a separate music information item; and
a music reproducing unit which outputs a music information item, and wherein the emotion detecting unit detects at least two emotions from the emotion specifying information item,
the music synthesizing unit synthesizes the music information items stored in the music storage unit and corresponding to the emotions detected by the emotion detecting unit, and
the music reproducing unit outputs the separate music information item generated by the music synthesizing unit.

2. The information processing terminal according to claim 1, wherein
the emotion specifying information item is a sound information item, and
the emotion detecting unit detects, from the sound information item, at least two emotions of an utterer who uttered a voice included in the sound information item.

3. The information processing terminal according to claim 1, wherein
the emotion specifying information item is a textual information item, and
the emotion detecting unit detects, from the textual information item, at least two emotions of a composer who composed a text made up of the textual information item.

4. The information processing terminal according to claim 1, wherein
the emotion specifying information item is an image information item, and
the emotion detecting unit detects, from the image information item, at least two emotions of a subject appearing in an image reproduced from the image information item.

5. The information processing terminal according to claim 2 further comprising:
a sound information input unit which inputs the sound information item,
wherein the emotion detecting unit detects, from the sound information item input from the sound information input unit, emotions of an utterer who uttered a voice included in the sound information item.

6. The information processing terminal according to claim 5, further comprising:
a communication unit,
wherein the sound information input unit inputs a sound information item acquired from a telephone device of a call destination by a voice call using the communication unit.

7. The information processing terminal according to claim 5, further comprising:
a sound pickup unit which picks up sound,
wherein the sound information input unit inputs a sound information item picked up by the sound pickup unit.

8. The information processing terminal according to claim 3, further comprising:
a textual information input unit which inputs the textual information item,
wherein the emotion detecting unit detects, from the textual information item input from the textual information input unit, emotions of the composer who composed the text made up of the textual information item.

9. The information processing terminal according to claim 8, further comprising:
a communication unit,
wherein the textual information input unit inputs a textual information item included as an information item in an electronic mail received by the communication unit.

10. The information processing terminal according to claim 8, further comprising:
an operating unit,
wherein the textual information input unit inputs a textual information item corresponding to a textual input operation accepted from the operating unit.

11. The information processing terminal according to claim 4, further comprising:
an image information input unit which inputs the image information item,
wherein the emotion detecting unit detects, from the image information item input from the image information input unit, emotions of a subject who appears in the image reproduced from the image information item.

12. The information processing terminal according to claim 11, further comprising:
an image taking unit,
wherein the image information input unit inputs the image taken by the image taking unit.

13. The information processing terminal according to claim 11, further comprising:
a communication unit,
wherein the image information input unit inputs the image information item received by the communication unit.

14. The information processing terminal according to claim 5, further comprising:
an utterer specifying unit which specifies an utterer who uttered a voice included in the sound information item; and
an associating unit which associates the utterer specified by the utterer specifying unit and the emotions detected by the emotion detecting unit for each music information item,
wherein the music synthesizing unit synthesizes the music information items stored in the music storage unit and corresponding to at least two of the emotions associated with the utterer by the associating unit.

15. The information processing terminal according to claim 14, further comprising:
a communication unit,
wherein, in a case where a voice call using the communication unit is performed, the utterer specifying unit uses a caller identification information item, notified from a telephone device of a call destination, to specify the utterer who uttered the voice included in the sound information item.

16. The information processing terminal according to claim 15, wherein the associating unit associates the utterer specified by the utterer specifying unit and the emotions detected by the emotion detecting unit for each voice call.

17. The information processing terminal according to claim 16, wherein the music synthesizing unit synthesizes the music information items stored in the music storage unit and corresponding to the at least two emotions associated with the utterer, for each voice call by the associating unit, in a sequence based on times at which the voice calls were made.

18. The information processing terminal according to claim 8, further comprising:
a composer specifying unit which specifies a composer who composed a text made up of the textual information item; and
an associating unit which associates the composer specified by the composer specifying unit and the emotions detected by the emotion detecting unit, for each textual information item,
wherein the music synthesizing unit synthesizes the music information items stored in the music storage unit and corresponding to at least two of the emotions associated with the composer by the associating unit.

19. The information processing terminal according to claim 18, further comprising:
a communication unit,
wherein, in a case where an electronic mail is received using the communication unit, the composer specifying unit uses a transmission source identification information item, notified from a transmission source of the electronic mail, to specify the composer who composed the text made up of the textual information item.

20. The information processing terminal according to claim 19, wherein
the associating unit associates the composer specified by the composer specifying unit and the emotions detected by the emotion detecting unit for each electronic mail.

21. The information processing terminal according to claim 20,
wherein the music synthesizing unit synthesizes the music information items stored in the music storage unit and corresponding to the at least two emotions associated with the composer for each electronic mail by the associating unit, in a sequence based on times at which the electronic mails were received.

22. The information processing terminal according to claim 11, further comprising:
a subject specifying unit which specifies a subject who appears in an image reproduced from the image information item; and
an associating unit which associates the subject specified by the subject specifying unit and the emotions detected by the emotion detecting unit for each image information item; and
wherein the music synthesizing unit synthesizes the music information items stored in the music storage unit and corresponding to at least two of the emotions associated with the subject by the associating unit.

23. The information processing terminal according to claim 22, further comprising:
a communication unit,
wherein, in a case where an image information item is received using the communication unit, the subject specifying unit uses a transmission source identification information item, notified from a transmission source, to specify the subject appearing in the image reproduced from the image information item.

24. The information processing terminal according to claim 23, wherein
the associating unit associates the subject specified by the subject specifying unit and the emotions detected by the emotion detecting unit for each image information item received.

25. The information processing terminal according to claim 24, wherein
the music synthesizing unit synthesizes the music information items stored in the music storage unit and corresponding to the at least two emotions associated with the subject for each image information item by the associating unit, in a sequence based on times at which the image information items were received.

* * * * *